May 18, 1965 L. V. DIVONE 3,183,664
VARIABLE-AREA ROCKET NOZZLE
Filed Jan. 28, 1963

Louis V. Divone,
INVENTOR.

United States Patent Office 3,183,664
Patented May 18, 1965

3,183,664
VARIABLE-AREA ROCKET NOZZLE
Louis V. Divone, Washington, D.C., assignor, by mesne assignments, to the United States of America as represented by the Secretary of the Army
Filed Jan. 28, 1963, Ser. No. 254,528
5 Claims. (Cl. 60—35.6)

The present invention relates to a rocket nozzle and more specifically to a rocket nozzle with a variable-area-ratio expansion cone.

It has long been a problem to accurately control the range of a missile, especially that of a solid propellant type missile. In a solid propellant missile it is difficult if not impossible to control the rate of burning once the propellant has been ignited. Thus, other means must be utilized to control the thrust and, therefore, the range of this type missile.

Although the range and thrust of a liquid propellant missile may be controlled by varying the amount of fuel fed to the motor, this invention has also proved a more simple and dependable means of making minute changes in thrust after the missile is in flight.

The area-ratio of a nozzle may be defined as the area at a particular section of the divergent part of the nozzle relative to the area of the throat of the nozzle. The variation of the area ratio of a rocket nozzle bears directly on the ultimate thrust generated during the burning time of the motor.

The object of my invention is to vary the thrust and therefore the range of a missile by expansion or contraction of the divergent portion of a missile nozzle. Roughly a 30% variation in thrust can be obtained by varying the area-ratio of the nozzle. If it is possible to control this nozzle-expansion facility throughout its full range then a considerable degree of control can be had over the range of the missile.

A further control effect over the nozzle is obtained by venting the divergent section of the nozzle, the details of which will be discussed later.

Other features of my invention will become apparent in the course of the following description hereof with reference to the accompanying drawings, given merely by way of example, and in which.

Figure 1:
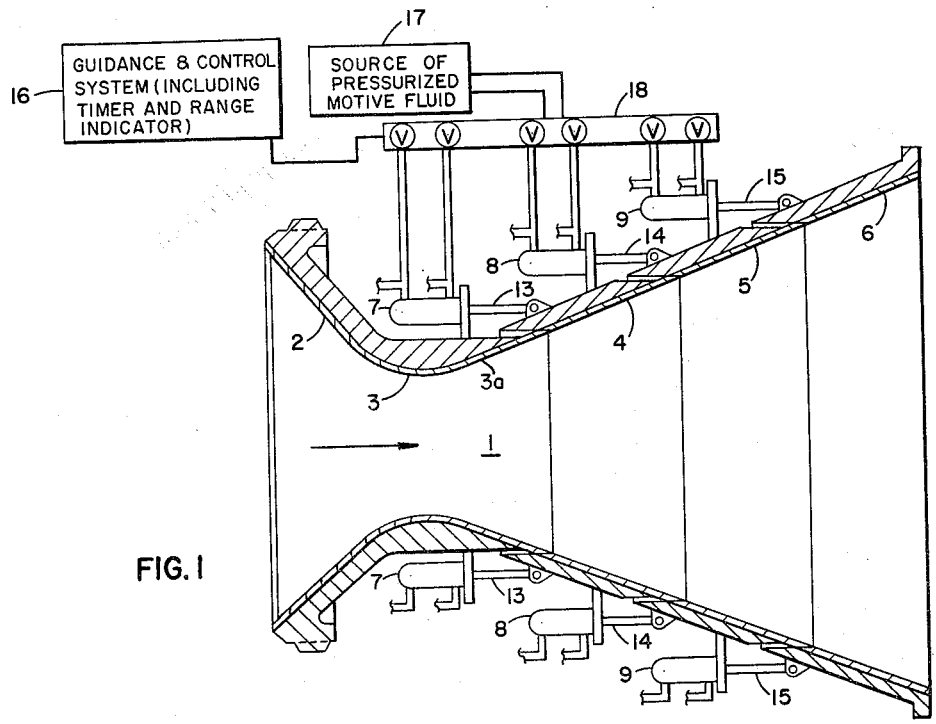
FIGURE 1 is a partial section illustrating the variable nozzle in its extended position and also showing schematically the nozzle control and actuating systems.
Figure 2:
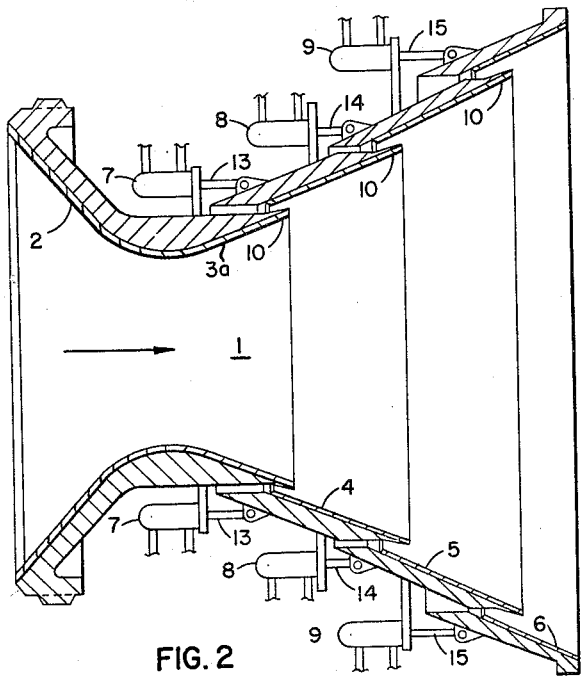
FIGURE 2 is a sectional view of the nozzle in its retracted position.

Referring now to FIGURE 1 it will be seen that nozzle 1 consists of a convergent section 2 at its forward end, a throat section 3 and a divergent rear portion that includes a fixed portion 3a and a series of annular divergent cone rings 4, 5 and 6 arranged co-axially relative to the center of the nozzle. Elements 7, 8 and 9 are hydraulic actuators disposed radially outwardly of rings 4, 5 and 6 and are connected to said rings by actuator rods 13, 14 and 15. Each ring is operated by two or more such actuators.

The joints between the rings are slidably operative along the axial plane of the motor and are specially designed to avoid binding due to thermal expansion.

The actuators are operated by pressurized fluid from a pump or other source shown diagrammatically by numeral 17.

The flow of pressurized fluid is controlled by selective and independent operation of valves 18. The valves are operated by a control system 16 shown diagrammatically in FIGURE 1. The control system may be a manual device, it may be controlled from the ground or it may operate automatically.

Figure 3:
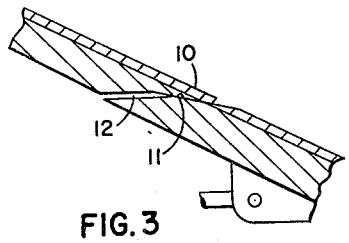
FIGURE 3 is an enlarged section of a portion of the nozzle in its extended position.

Referring now to FIGURE 3, the trailing or divergent edge 10 of each of the three rings is tapered radially inwardly to fit the oppositely tapered surface 11 of the forward or convergent edge of the ring aft of it. The remaining surfaces between the rings are radially spaced as indicated by 12 to leave room for expansion.

In operation movement of the cone rings will effect the thrust in three ways, that is, by changing the cone angle, by breaking up the smooth flow lines of the nozzle, and by venting the divergent portion of the nozzle via the space between the cone ring when in the retracted position. As pointed out above the device is versatile in its mode of operation. For automatic control a missile using this system could be fired at full thrust, and after take-off a variation of the expansion area could control its range. For manual control a firing table can be set up for a missile using the variable-area-ratio nozzle which should allow for a variation over about one-third or more of the maximum range. In this case only ground settings would be made. This missile can also be set for a certain range before take-off and vernier corrections can be made by ground control or inertial systems.

While the foregoing is a description of the preferred embodiment, the following claims are intended to include those modifications and variations that are within the spirit and scope of my invention.

I claim:
1. A variable area rocket nozzle comprising; a convergent portion, a throat portion and a divergent portion, said divergent portion having axially movable cone sections, and actuating means including at least one separate actuator attached to each of said cone sections and fixed to an adjacent structure so as to render said actuating means capable of independently moving from one to all of said cone sections from an extended to a retracted position, and when more than one of said cone sections are moved from an extended to a retracted position, to be capable of moving said moved cone sections relative to each other.

2. A variable area rocket nozzle including: a smooth tapering convergent forward portion; a smooth tapering throat central portion; a relatively smooth divergent rear portion, said divergent portion including a fixed portion and a series of annular divergent telescopingly arranged cone rings; and actuating means for actuating said cone rings to and from a rear extended position and a forward retracted position, said actuating means including means on said fixed portion and connected to a first of said cone rings for actuation thereof and means on each of the cone rings, save the rearmost cone ring, connected to the cone ring in next rear thereof for actuation thereof, and means for selectively and independently controlling actuation of said means on said fixed portion and said means on each of said cone rings.

3. A variable area rocket nozzle as set forth in claim 2, wherein said actuating means includes at least two hydraulic motor means for actuating each of said cone rings.

4. A variable area rocket nozzle as set forth in claim 2, wherein said cone rings are so mounted relative to each other that actuation of said means on said fixed portion will actuate all of said cone rings toward a forward retracted position.

5. A variable area rocket nozzle as set forth in claim 2, wherein said telescopingly arranged cone rings have tapered joints therebetween with radial outer portions of each of said joints being spaced apart to define expansion space.

References Cited by the Examiner

UNITED STATES PATENTS 2,437,385   3/48   Halford.
3,049,873   8/62   Weeks _____ 60—35.6

FOREIGN PATENTS 814,012   5/59   Great Britain.

SAMUEL LEVINE, *Primary Examiner*.

ABRAM BLUM, *Examiner*.